United States Patent
Hendrichs et al.

(10) Patent No.: US 6,760,348 B1
(45) Date of Patent: Jul. 6, 2004

(54) SYSTEM AND METHOD FOR TONE DETECTION IN A DISCRETE MULTI-TONE SYSTEM

(75) Inventors: Laurent Hendrichs, Long Branch, NJ (US); Hubert de Lassus, Highlands, NJ (US)

(73) Assignee: Globespanvirata, Inc., Red Bank, NJ (US)

( * ) Notice: Subject to any disclaimer, the term of this patent is extended or adjusted under 35 U.S.C. 154(b) by 0 days.

(21) Appl. No.: 09/471,310

(22) Filed: Dec. 23, 1999

Related U.S. Application Data (60) Provisional application No. 60/113,913, filed on Dec. 28, 1998.

(51) Int. Cl.[7] ................................................... H04J 3/12
(52) U.S. Cl. ........................ 370/522; 370/526; 375/329
(58) Field of Search ................................ 370/522–527, 370/203, 208; 375/279, 280, 329; 379/283, 284

(56) References Cited

U.S. PATENT DOCUMENTS

| | | | | | |
|---|---|---|---|---|---|
| 4,171,516 A | * | 10/1979 | Challen et al. | ............. | 325/466 |
| 5,644,573 A | * | 7/1997 | Bingham et al. | ........... | 370/503 |
| 6,002,722 A | * | 12/1999 | Wu | ............................. | 375/295 |
| 6,108,349 A | * | 8/2000 | Melsa et al. | ................. | 370/465 |
| 6,185,251 B1 | * | 2/2001 | Fertner | ........................ | 375/231 |
| 6,438,186 B1 | * | 8/2002 | Strait | .......................... | 375/354 |
| 6,445,747 B1 | * | 9/2002 | Jafarkhani et al. | .......... | 375/285 |
| 6,473,438 B1 | * | 10/2002 | Cioffi et al. | ................. | 370/468 |

FOREIGN PATENT DOCUMENTS

| | | | | | |
|---|---|---|---|---|---|
| SE | WO 98/34368 | * | 8/1998 | ............. | H04L/7/10 |
| US | WO 95/34149 | * | 12/1995 | ............. | H04L/5/06 |

* cited by examiner

*Primary Examiner*—Alpus H. Hsu
*Assistant Examiner*—Toan Nguyen
(74) *Attorney, Agent, or Firm*—Thomas, Kayden, Horstemeyer & Risley (57) ABSTRACT

The present invention is directed to a system and method for determining when a particular tone in a discrete multi-tone communications system is being used to transmit a control signal. Broadly, the system and method of the present invention are realized by a digital signal processor that is configured to detect a constant phase shift on individual tones when a control signal condition is present.

29 Claims, 7 Drawing Sheets

FIG. 1

(Prior Art)

FIG. 2

(Prior Art)

SYSTEM AND METHOD FOR TONE DETECTION IN A DISCRETE MULTI-TONE SYSTEM

CROSS-REFERENCE TO RELATED APPLICATION

The present application claims the benefit of U.S. provisional patent application, serial No. 60/113,913, filed Dec. 28, 1998, which is hereby incorporated by reference in its entirety.

BACKGROUND OF THE INVENTION

1. Field of the Invention

The present invention generally relates to communication systems, and more particularly, to a system and method for detecting particular tones in communication systems using the discrete multi-tone standard.

2. Discussion of the Related Art

In recent years, telephone communication systems have expanded from traditional plain old telephone system (POTS) communications to include high-speed data communications as well. As is known, POTS communications include the transmission of voice information, control signals, PSTN (public switched telephone network) information, as well as, information from ancillary equipment in analog form (i.e. computer modems and facsimile machines) that is transmitted in the POTS bandwidth.

Prompted largely by the desire of large businesses to reliably transfer information over a broadband network, telecommunications service providers have employed discrete multi-tone, hereinafter DMT, systems to provide a plethora of interactive multi-media digital signals over the same existing POTS twisted-pair lines. The provision of asynchronous digital subscriber lines (ADSL) using DMT systems to customer premises has proliferated over recent years. Since ADSL signals are transmitted in a higher frequency band than that of the POTS frequency band, transmitting signals from both the POTS and ADSL frequency bands over the same twisted-pair telephone line (even at the same time), generally is not a problem. Specifically, the POTS frequency band is generally defined from 0 Hz to 4 kHz, while ADSL frequency bands are generally defined by a lower cutoff frequency of approximately 26 kHz, and an upper cutoff frequency of approximately 1 MHz.

In the past, a combination of circuits termed hybrids, and POTS splitters have served to buffer ADSL equipment from distortions and interference introduced in the ADSL frequency bands from the lower frequency POTS equipment. In a DMT-G.Lite standard configuration, the POTS splitter is no longer present. As a result, POTS equipment operates on the same twisted-pair phone line that is being used to deliver ADSL services. POTS equipment operating in this configuration is subject to interference from low frequency harmonics generated within the ADSL equipment.

Conversely, and of greater significance, the presence of abrupt changes in line conditions due to ringing, customer premises noise, POTS handset pick-up, and on/off-hook transitions from ancillary equipment, can disrupt ADSL transmissions. Splitterless operation of an ADSL often incurs a significant and abrupt insertion-loss change upon the off-hook terminating impedance change of the POTS device. DMT systems, by nature of their distribution across multiple frequency bands, are capable of retuning devices to optimize data transfer for changing line conditions. DMT devices selectively transfer bits from the data stream in those discrete frequency bands that are uncorrupted from amplitude modulation radio interference and unaffected by phone system bridge taps, thereby tuning, or maximizing performance under changing line conditions.

Tuning of DMT system parameters is currently performed in two distinct ways: initial training, hereinafter called "full retrain," and bit loading/swapping, an online optimization procedure. Another often suggested means to retune a system is a fast retrain of the connection. A full retrain of the system connection results in a temporary loss of service and is undesirable under most conditions. Of the methods used to tune DMT parameters, fast retrain is best suited to overcome transient effects, while bit loading/swapping is more adapted to slowly varying changes. The fast retrain method is more robust than bit loading/swapping and provides for a more optimized system since it can actively readapt other system components such as equalizers and echo-cancelers to the system noise environment.

The fast retrain algorithm is triggered when either the central office or the remote transmission unit sense the need to transition from the current parameter profile to a more appropriate previously stored parameter profile. The most typical situation that triggers a fast retrain is when a POTS device goes on/off hook. These transitions create impedance transients that adversely affect the ADSL frequency spectra. When the central office's equipment initiates a fast retrain procedure, the transmission device discontinues sending data with DMT cyclic prefix and begins sending two signal tones (DMT signal tones 64 and 68) without cyclic prefix. The remote device within the customer's premises, which is still configured to accept data with cyclic prefix, has to detect the transmission of the two signal tones to trigger the fast retrain event.

Prior art tonal state detectors generally use a measure of total signal power within the frequency band to determine if a particular tone is being used for data transfer. Specifically, prior art detectors observe the total power within the frequency band of tone 68 and compare it to a preset threshold or to the energy of adjacent tones in order to make the determination that the central office is sending a control signal. The former method has the. drawback of requiring a decision value based on unknown parameters. The threshold value will depend upon ambient noise, receiver gain, loop attenuation, and other environmental factors. The latter method detects sudden changes in a power ratio equal to the power of tone 68 divided by the average power of adjacent tones. The method of comparing tone 68 power to power levels in adjacent tones is more complex in that it requires increased computation time to determine average powers in several tones. In addition, DMT schemes by their very nature can vary power within each of the tones by shifting bits among the individual frequency bands, making it impossible to anticipate a power ratio that will correspond to a control signal in all cases. Lastly, the latter method requires a division step that is not easily implemented on digital signal processors.

Accordingly, it is desired to provide a system and method that efficiently, accurately, and quickly detects the condition in a DMT system where either the central office or a remote device is requesting a fast retrain of the system.

SUMMARY OF THE INVENTION

Certain objects, advantages and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the objects and advantages of the present invention, the present invention is directed to a system and a method for detecting a condition where either the central office or a remote device in a DMT system is requesting a fast retrain of the system. The innovative solution of the present invention focuses on the characteristics of tone 68 in making the determination to trigger a fast retrain of the DMT system. More specifically, the present invention evaluates and identifies a phase shift in tone 68 to identify when either party is requesting a fast retrain. It has been determined that when a DMT system is in data transfer mode that the phase shift on tone 68 will be random in nature. When the central office has requested a fast retrain of the system by removing the cyclic header on each frame of data being transmitted on tone 68, the phase of tone 68 will have a constant shift of $\pi/2$ at each symbol. The following relationships explain the phase shift at each symbol:

There are 68 periods for tone 68 in one symbol.

The cyclic prefix represents 16/256 of a symbol and covers (16/256)*68=4.25 periods.

4.25 periods modulo $2\pi$ yields 0.25 periods or a $\pi/2$ phase shift due to the removal of the cyclic prefix.

In accordance with one embodiment of the present invention, a system and method is provided for detecting a constant phase shift on tone 68 by estimating the mean phase shift over a predetermined number of samples and determining whether it exceeds a predetermined threshold. In an alternative embodiment, a system and method is provided for detecting a constant phase shift on tone 68 by calculating the cross product of the real and imaginary portions of successive frequency domain values of tone 68. The result of the cross product will approach 0 if tone 68 is in data transfer mode. The result in the mean approaches the square of the average energy in the tone if the cyclic prefix has been removed and tone 68 is indicating a fast retrain of the system is in order.

DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE PREFERRED EMBODIMENT

Having summarized various aspects of the present invention, reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims.

It will be apparent to one of ordinary skill in the art that the present invention can be applied across the spectrum of digital subscriber line (DSL) services. To reflect applicability across the multitude of DSL services, hereinafter, reference to DSL equipment and services will be designated xDSL.

Figure 1:
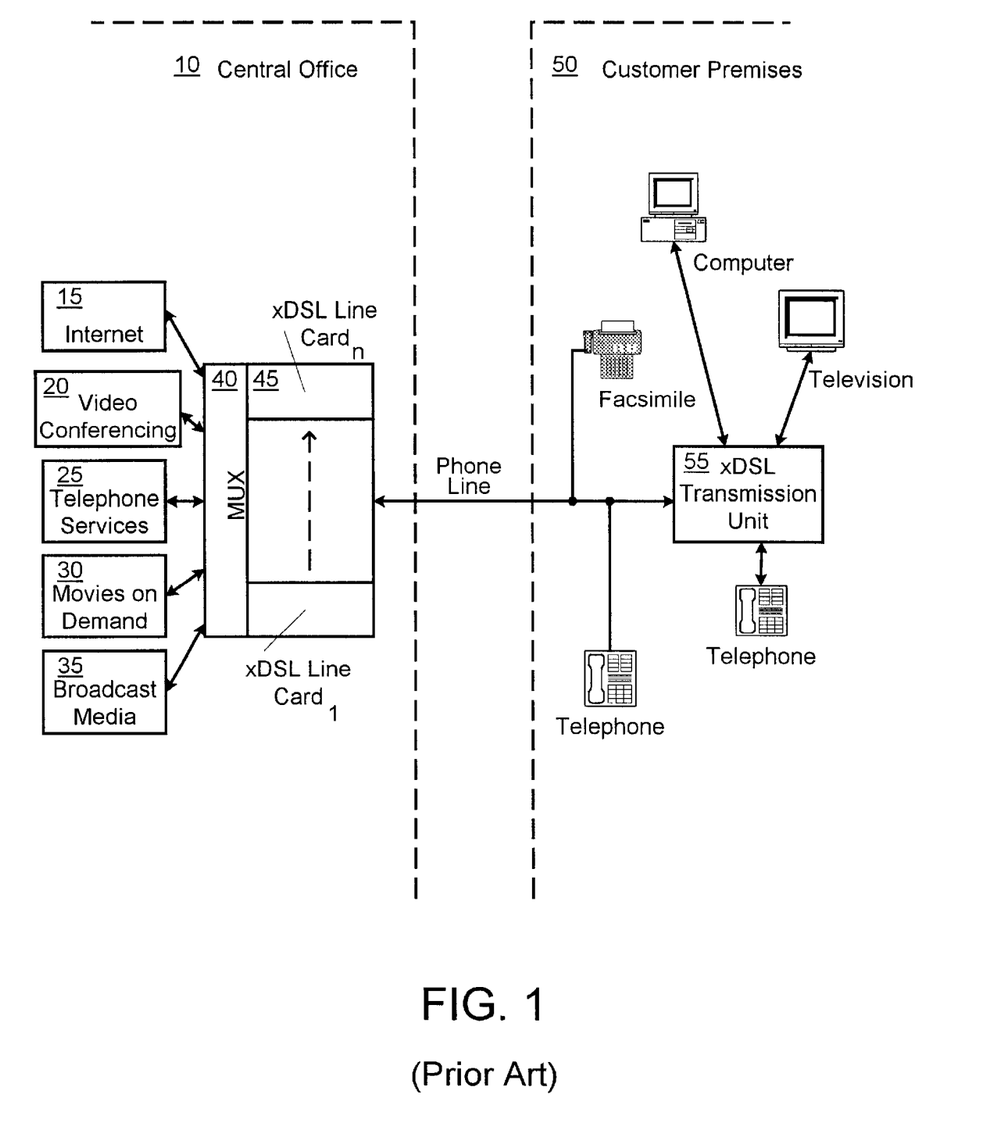
FIG. 1 is a block diagram illustrating the delivery of multiple broadband services via a communications system on a telephone line.

Turning now to the drawings, reference is made to FIG. 1 which illustrates the delivery of broadband communication services via an xDSL over the POTS network. In this regard, a central office 10 is configured to receive broadband services which it assembles via central office xDSL line cards 45 for transmission over a POTS phone line to a customer premises 50. Examples of such broadband services are depicted as Internet 15, video conferencing 20, telephone services 25, movies on demand 30, and broadcast media 35. Central office 10 assembles signals from the aforementioned broadband services via mux 40 for appropriate transformation and transmission by xDSL line cards 45.

Customer premises 50 has a compatible xDSL transmission unit 55 which processes and distributes the several services to appropriate destination devices such as a computer, television, and a telephone as illustrated. It is significant to note that customer premises 50 may have POTS devices such as the facsimile machine and another telephone integrated on the PSTN line along with xDSL transmission unit 55. On/off hook impedance transitions introduced by POTS devices such as the telephone and the facsimile machine illustrated in FIG. 1 can interrupt xDSL communications that must traverse the same PSTN line. It should be understood that the circuitry conventionally implemented in, for example, an xDSL transceiver will be included within xDSL line cards 45 and xDSL transmission unit 55 as shown in FIG. 1. The implementation of such circuitry will be appreciated by persons skilled in the art, and need not be described herein.

Figure 2:
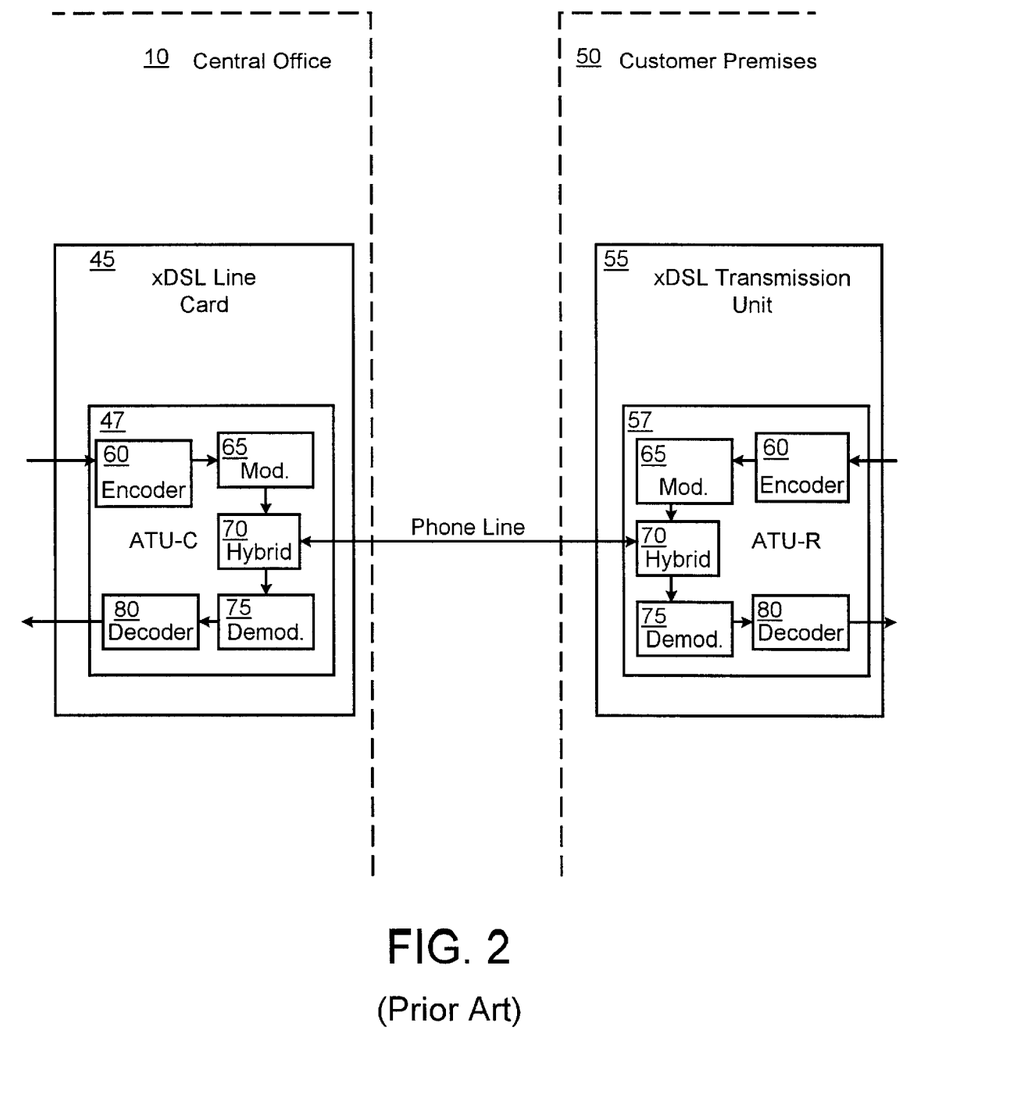
FIG. 2 is a block diagram further illustrating a communications system in accordance with FIG. 1.

Having provided a top level description of a communications system configured to deliver a multitude of broadband services, reference is now made to FIG. 2, which illustrates a portion of an xDSL line card 45 and xDSL transmission unit 55 as shown in FIG. 1. In this regard, xDSL line card 45 contains an xDSL transmission unit—central office, hereinafter ATU-C 47. Similarly, xDSL transmission unit 55 contains an xDSL transmission unit—remote, hereinafter ATU-R 57. Both ATU-C 47 and ATU-R 57 serve to enable two-way communications between xDSL line cards 45 and xDSL transmission unit 55 via the PSTN. Since each ATU is similarly configured, the description herein will address the five functional blocks only once. Both ATU-C 47 and ATU-R 57 receive digital data in encoder 60. Encoder 60 processes the digital data and forwards it to modulator 65 which adaptively applies the digital data across the DMT frequencies. Modulator 65 then forwards a multitude of designated spread spectrum frequencies to hybrid 70 for data transmission along the PSTN line. In the manner described above, data is assembled, adaptively applied, and transmitted from one xDSL device to another across each of the separate DMT channels as the physical characteristics of the environment surrounding each individual system allows.

Similarly, hybrid 70 is configured to receive a multitude of spread spectrum frequencies from the remote xDSL transmission unit along the PSTN line. Hybrid 70 forwards designated spread spectrum frequencies to demodulator 75. Demodulator 75 processes the set of spread spectrum frequencies to remove digital data. Demodulator 75 forwards the digital data to decoder 80. Decoder 80 processes the digital data and distributes it to the appropriate broadband device.

In a communications system utilizing DMT, there are a variety of xDSL protocols that serve to coordinate the functions of individual units in the system. One such signal is the two tone signal, C_RECOV. Upon detection of the C_RECOV signal, the non-initiating xDSL transmission unit configures itself for a fast retrain. C_RECOV is defined as the combination of tone 64 (pilot tone) and tone 68, when tone 68 is no longer being used for data transfer. In the case of a true C_RECOV signal, the transmitting xDSL unit removes the cyclic prefix from the frames of data transmitted within tone 68.

Figure 3:
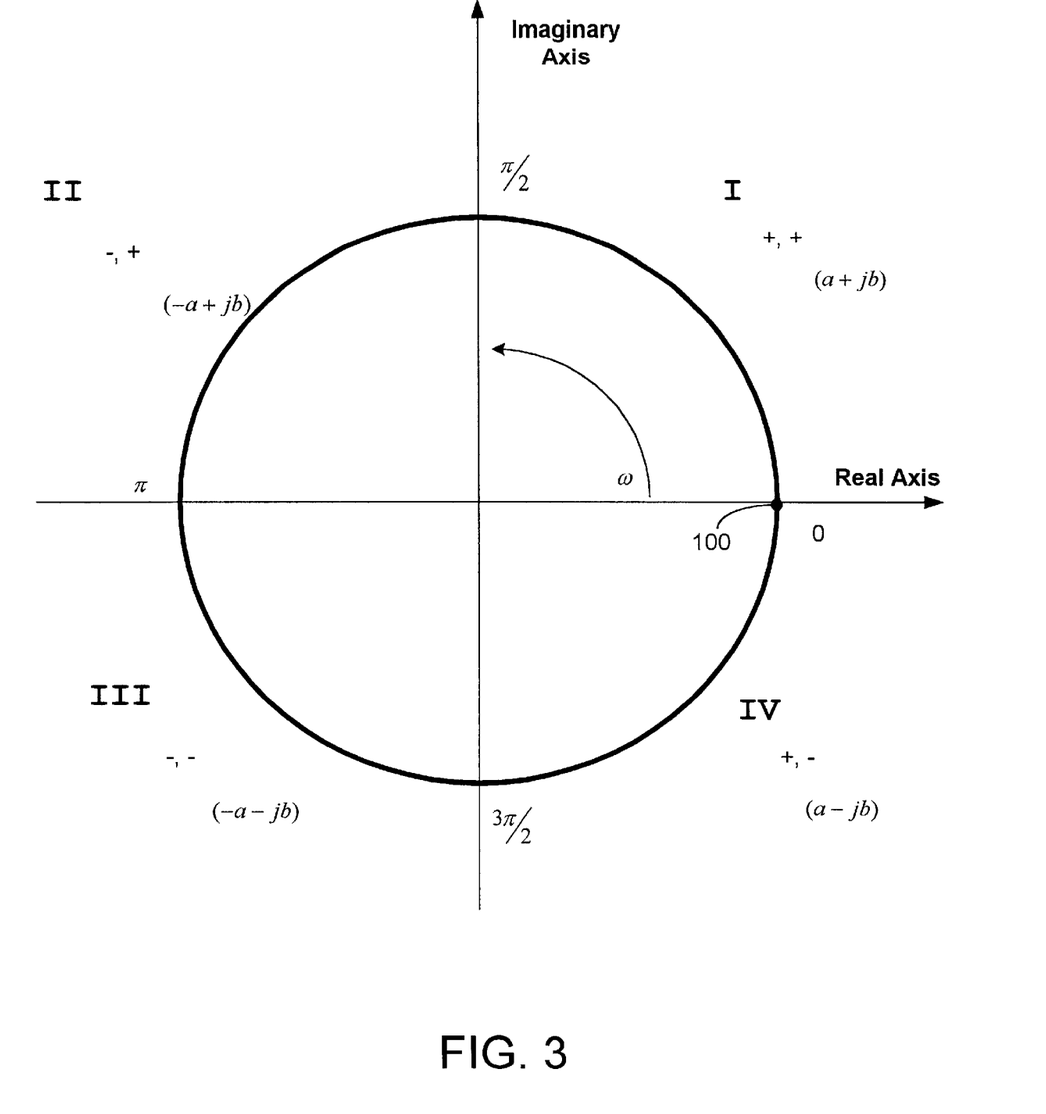
FIG. 3 is a diagram illustrating symmetry within the complex exponential circle.

In accordance with a fundamental aspect of the present invention, when the cyclic prefix is removed from tone 68, a constant phase shift of $\pi/2$ occurs for each symbol. It can be shown that due to the symmetry of the unit complex exponential circle, each shift of $\pi/2$ radians results in a change in either the real sign or the imaginary sign of a complex number. This symmetry is illustrated in FIG. 3. Traveling counter-clockwise from reference point 100 around the unit complex circle, four quadrants are encountered, wherein coefficients a and b, making up a complex number, can be used to identify points on the unit circle. Quadrants I, II, III, and IV defined by the intersection of the real and imaginary axes can also be identified by their real and imaginary signs. For example in Quadrant I, both the real and the imaginary signs are positive and complex numbers on the unit circle can be represented as a +jb. Rotating counter-clockwise by $\pi/2$, results in a transition into Quadrant II where the real portion sign becomes negative and numbers on the unit circle are represented as –a +jb. For each full rotation the real portion of a complex number has a constant pattern (1, 0, –1, 0). Similarly, for each full rotation the imaginary portion of a complex number has a constant pattern (0, 1, 0, –1).

Figure 4:
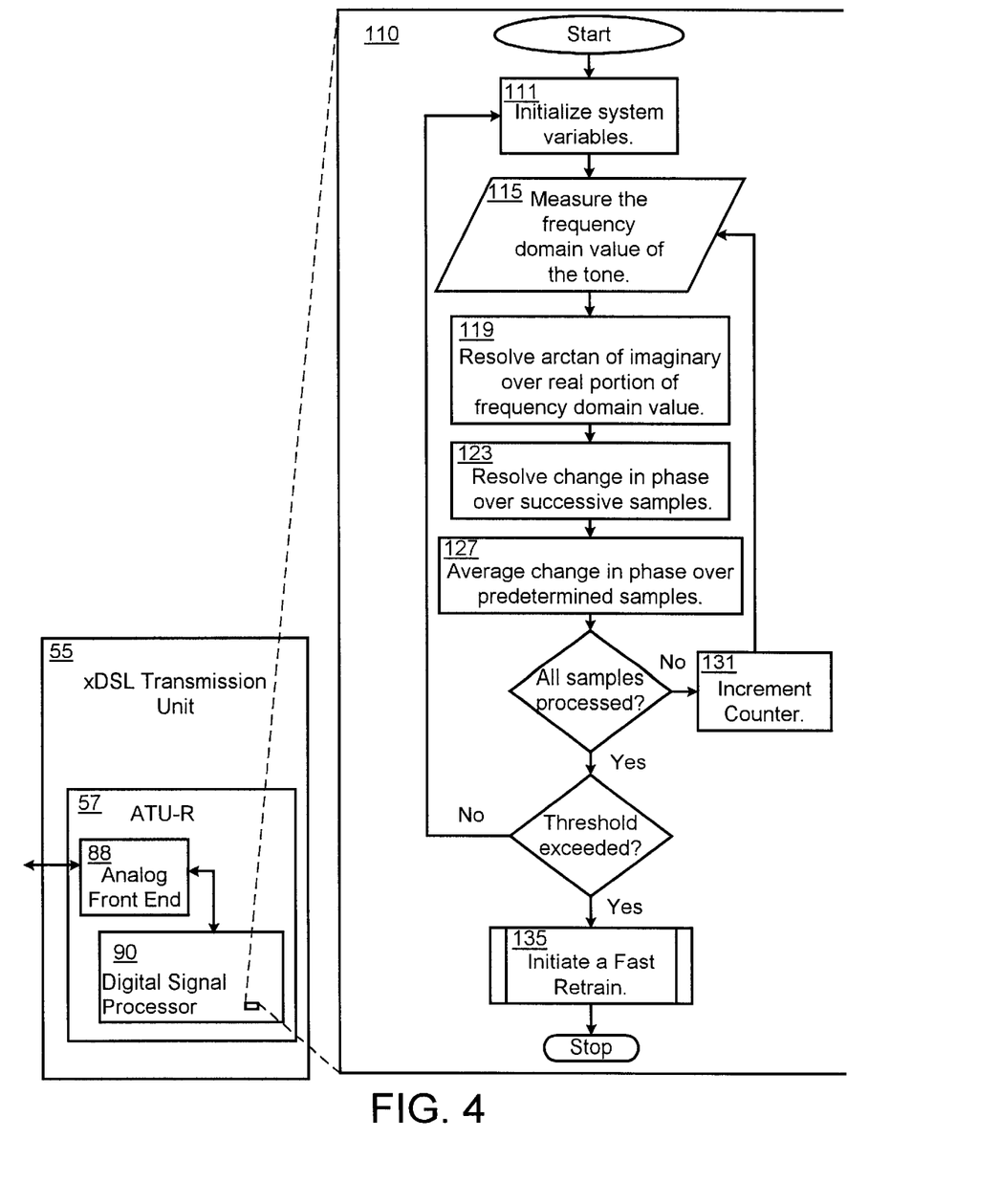
FIG. 4 is a block diagram of a system that illustrates the method steps of one embodiment of the present invention.

In accordance with one embodiment of the present invention, when an xDSL transmission unit removes the cyclic prefix from tone 68, the decision whether to trigger a fast retrain of the communication system is determined by checking the mean phase shift is over a predetermined number of symbols, N. A system utilizing such a method is illustrated in FIG. 4. The system consists of an analog front end 88 and a digital signal processor 90 within ATU-R 57. ATU-R 57 is located within xDSL transmission unit 55 which was shown in FIGS. 1 and 2 at customer premises 50. Digital signal processor 90 can be configured to perform any of a number necessary functions in order to coordinate the two-way transmission of broadband data in a DMT system. As further illustrated in FIG. 4, the system of the present invention starts method 110 by initializing system variables in step 111. The system measures the frequency domain value of the DMT tone 68 in step 115. Next, in step 119, the system computes the phase of the frequency domain value by solving for the arctangent of the imaginary over the real portion of the complex value measured in step 115. In step 123, the system calculates the change in phase between successive samples. The system proceeds to solve for the average change in phase over a predetermined number of samples in step 127. If all N samples have been processed, the system compares the average change in phase to a predetermined threshold value to determine if the system should proceed to step 135 and initiate a fast retrain of the system. If the mean phase shift is less than a predetermined threshold for the past N symbols, the system is in data transfer mode and a fast retrain should not be triggered. If the mean phase shift is greater than the predetermined threshold, the system is transmitting a C_RECOV signal and a fast retrain should be initiated. If all samples have not been processed, a counter is incremented in step 131 and steps 115, 119, 123, and 127 are repeated until all N samples have been processed. If all N samples have been processed and the predetermined threshold value is not exceeded, the system returns to step 111 where it initializes the system variables and repeats the process of solving for the average change in phase over successive samples.

The phase shift estimator of the first embodiment is illustrated in the equations below:

$E(\Phi_n - \Phi_{n-1}) \rightarrow -\pi/2$, in the C_RECOV case;

$E(\Phi_n - \Phi_{n-1}) \rightarrow 0$, in the data transfer mode case.

$$\text{Where, } \Phi_n = \arctan\left(\frac{Im(Xf_{68})}{Re(Xf_{68})}\right). \quad \text{Eq. 1}$$

For 20-bit precision arithmetic, $\Phi_n$ can be evaluated in 20 iterations with the Coordinate Rotational Digital Computer (CORDIC) algorithm.

$x_0 = Re(X(j\omega_{68}))$
$y_0 = Im(X(j\omega_{68}))$
$z_0 = 0$
for k=0, 1, 2, ... , 19
   $\delta_k = \sin(y_k)$
   $\epsilon_k = \arctan(2^{-k})$
   $x_{k+} = x_k - \delta_k y_k 2^{-k}$
   $y_{k+1} = y_k + \delta_k x_k 2^{-k}$
   $z_k = 2^k - \delta_k \epsilon_k$
end for $$z_{20} = \arctan\left(\frac{y_0}{x_0}\right) = \Phi(X(j\omega_{68})).$$

For each symbol, the average phase shift, P, is calculated as follows:

$\alpha = 1/n$, where N is the number of symbols sampled.

$P_0 = 0$ $\Phi_n = CORDIC(X_{n,68})$ $\delta(\Phi_n) = \Phi_n \Phi_n - 1$ $P_n = (1-\alpha)P_{n-1} + \alpha\delta(\Phi_n)$.

As described above, for those cases where $P_n < P_{th}$, a fast retrain is triggered.

Figure 5:
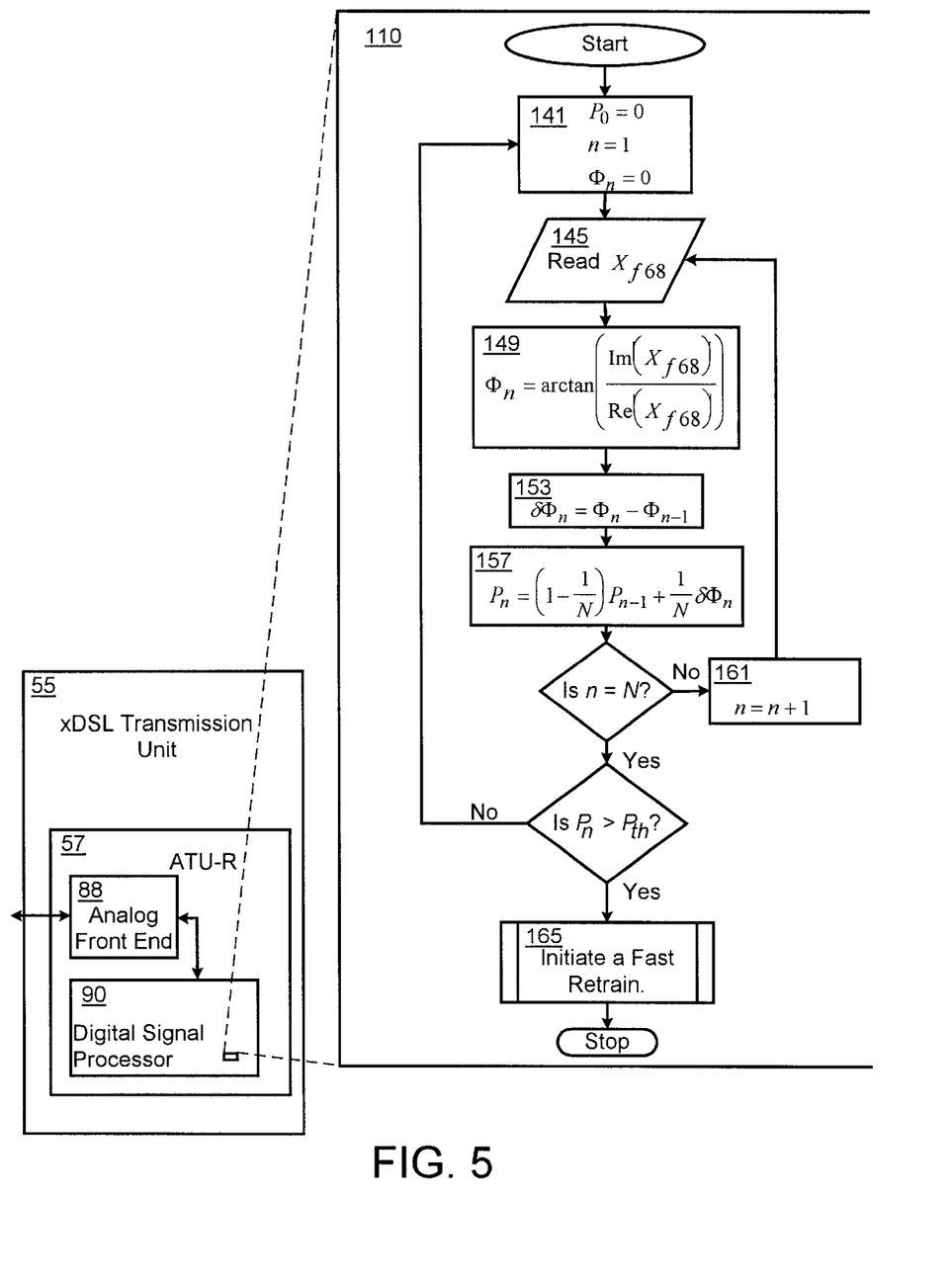
FIG. 5 is a block diagram of a system that further illustrates the method steps of FIG. 4.

A system utilizing the method 110 described above is further illustrated in FIG. 5. In step 141, n, a counter, is set to 1. System variables $P_0$, the change in phase, and $\Phi_n$, the phase for each sample symbol, are both set to 0. In step 145, $X_{f68}$, the frequency domain value for the sample symbol of tone 68 is measured. Next in step 149, $\Phi_n$, the phase for each sample symbol is calculated by solving Eq. 1 as shown above. In step 153, the change in phase between successive sample symbols is calculated by subtracting the phase of the previous sample symbol from the phase of the current sample symbol. Last, the change in phase is averaged over a number of predetermined samples by performing Eq. 2 as shown above. If all samples have not been processed, a counter is incremented in step 161 and steps 145, 149, 153, and 157 are repeated until all N samples have been processed. If the mean change in phase is greater than a predetermined threshold, the system is transmitting a C_RECOV signal and a fast retrain is initiated by step 165. If all N samples have been processed and the predetermined threshold value has not been exceeded, the system returns to step 141 where it initializes the system variables and repeats the process of solving for the average change in phase over successive samples.

In accordance with a second embodiment of the present invention, when an xDSL transmission unit removes the cyclic prefix from tone 68, the decision whether to trigger a fast retrain of the communication system is determined by taking advantage of the symmetry between the real and imaginary portions of successive symbols.

Figure 6:
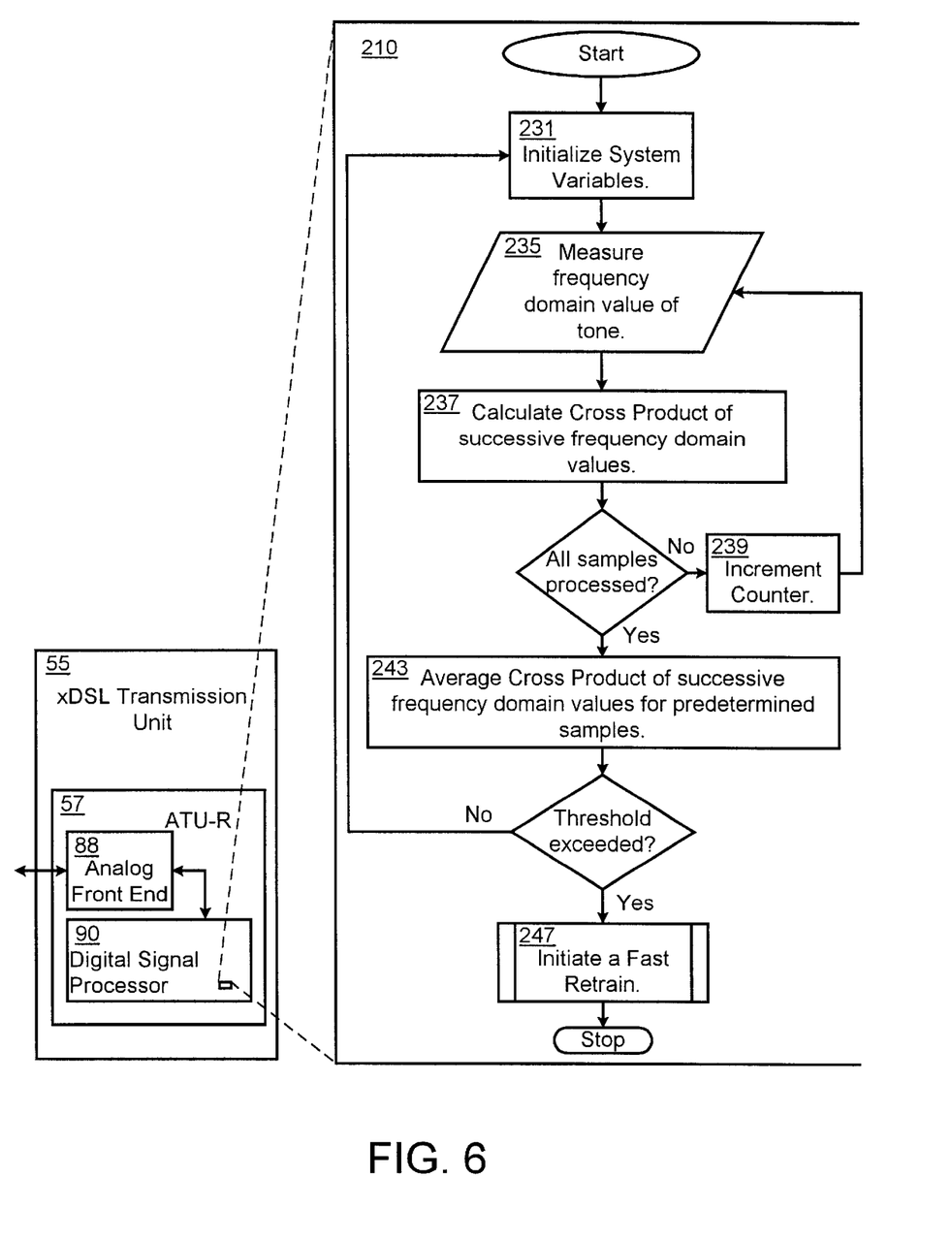
FIG. 6 is a block diagram of a system that illustrates the method steps of an alternative embodiment of the present invention.

When an xDSL transmission unit removes the cyclic prefix from tone 68, the decision whether to trigger a fast retrain of the communication system can be made by solving for the expectancy of C, the cross product of successive samples of tone 68, as shown in FIG. 6. The system of FIG. 6 consists of an analog front end 88 and a digital signal processor 90 within ATU-R 57. ATU-R 57 is located within ADSL transmission unit 55 which was shown in FIGS. 1 and 2 at customer premises 50. Digital signal processor 90 can be configured to perform any of a number necessary functions in order to coordinate the two-way transmission of broadband data in a DMT system. As illustrated in FIG. 6, the system of the present invention starts method 210 by initializing system variables in step 231. The system measures the frequency domain value of tone 68 in step 235. Next, in step 237, the system calculates the cross product of successive frequency domain values measured in step 235. If all samples have not been processed, a counter is incremented in step 239 and steps 235 and 237 are repeated until all N samples have been processed. If all N samples have been processed, the system proceeds to step 243 where the system calculates the average cross product over a predetermined number of samples to estimate the square of the frequency domain magnitude of the received samples. Last, the system compares the average cross product to a predetermined threshold value to determine if the system should proceed to step 247 and initiate a fast retrain of the system.

The phase rotation estimator of the second embodiment is illustrated in the equations below:

$$C = E[Im(X_{68}(n))*Re(X_{68}(n-1)) - Im(X_{68}(n-1))*Re(X_{68}(n))], \text{ Eq. 3}$$

Where E is the expectancy of random variable C and $X_{68(n)}$ is the frequency domain value of tone 68 for symbol n.

C=0 for random data, and

C=$|X_{68}|^2$ if tone 68 is sent without cyclic prefix.

The following estimator can be used to solve for C.

$$\hat{C} = \frac{\sum_{n=1}^{N} [Im(X_{68}(n))*Re(X_{68}(n-1)) - Im(X_{68}(n-1))*Re(X_{68}(n))]}{N}. \quad \text{Eq. 4}$$

Figure 7:
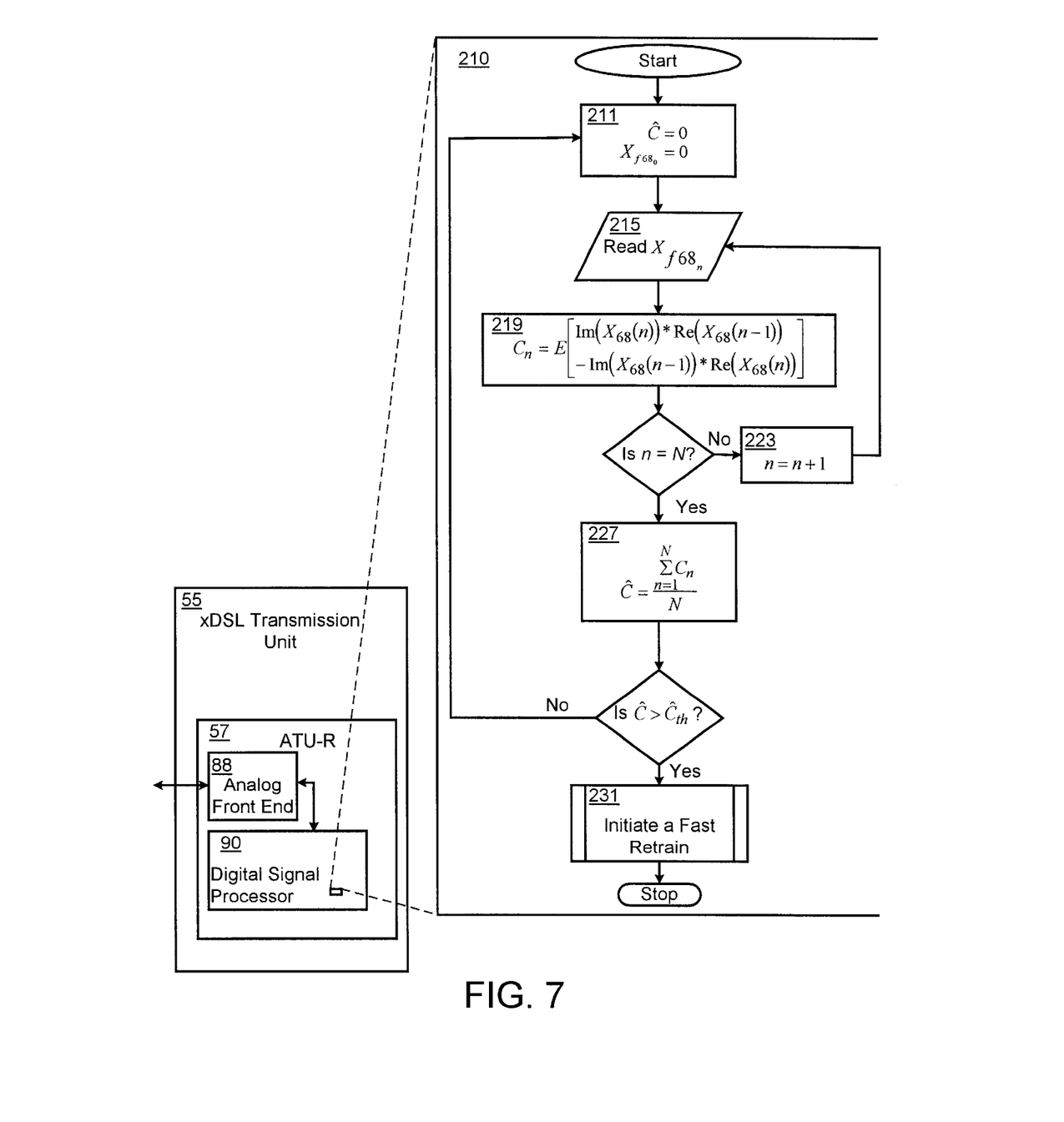
FIG. 7 is a block diagram of a system that further illustrates the method steps of the alternative embodiment shown in FIG. 6.

A system utilizing method 210 illustrated in FIG. 6 and described in Equations 3 and 4 above is further illustrated in FIG. 7. In step 211, system variables $\hat{C}$ and $X_{f68}$ are both set to 0. In step 215, $X_{f68}$, the frequency domain value for the sample symbol of tone 68 is measured. In step 219, the cross product of successive frequency domain values is calculated as shown in Equation 3, above. If all samples have not been processed, a counter is incremented in step 223 and steps 215, and 219 are repeated until all N samples have been processed. If all N samples have been processed, the system proceeds to step 227 where Equation 4, as shown above, is performed to solve for the expectancy of random variable $\hat{C}$. If the expectancy of $\hat{C}$ is greater than a predetermined threshold, the system is transmitting a C_RECOV signal and a fast retrain is initiated in step 231. If the expectancy of $\hat{C}$ does not exceed the predetermined threshold, the system returns to step 211 where it initializes the system variables and repeats the process of solving for the average cross product between successive sample symbols.

It will be readily apparent to those of ordinary skill in the art that the methods of the present invention can be modified and used to detect other control signals in a DMT system wherein the tonal response to transmission of the control signal is a constant phase shift. For example, tone 20 is used in the R_RECOV control signal and responds similarly to tone 68 when the cyclic prefix is removed, that is, a constant phase shift of $\pi/2$ radians at each symbol. As a result, the methods herein described for detecting the C_RECOV signal tone on tone 68 can be readily applied for the detection of the R_RECOV signal tone on tone 20.

In addition, handshake tones, used to abort the fast retrain process are similar to tones 20 and 68 in that removal of the cyclic prefix results in a constant phase shift. However, for the handshake tones the constant phase shift is $\pi/8$ radians. Therefore, a similar phase estimator to that illustrated in Equation 4 above can be used to determine when a handshake signal is being transmitted. For a constant phase shift of $\pi/8$ radians, the (n−1) index that appears in Equation 4 must be modified to (n−4).

In this regard, the embodiment or embodiments discussed herein were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. A method for detecting control signals in a discrete multi-tone communications system wherein the phase shift of a tone is constant comprising:

computing an average phase shift of the tone; and comparing the average phase shift to a predetermined value to determine if a control signal is present.

2. The method of claim 1, wherein the step of computing the average phase shift is applied to a single tone of a dual tone signal.

3. The method of claim 1, wherein the step of computing the average phase shift is applied to discrete multi-tone tone 68.

4. The method of claim 1, wherein the step of computing the average phase shift is applied to discrete multi-tone tone 20.

5. The method of claim 1, wherein the step of computing the average phase shift is applied to discrete multi-tone handshake tones.

6. The method of claim 1, wherein the step of computing the average phase shift is performed over a predetermined number of samples.

7. A method for detecting the removal of a cyclic prefix from a tone in a discrete multi-tone communications system wherein a phase shift of the tone is constant comprising:

measuring a frequency domain value of tone 68 for each of a predetermined number of sample symbols;

calculating a phase of each frequency domain value;

calculating a change in phase between successive frequency domain values;

calculating an average change in phase over the predetermined number of samples; and comparing the average change in phase to a predetermined threshold to determine if the cyclic prefix is present.

8. The method of claim 7, wherein the step of measuring the frequency domain value is applied to tone 20.

9. The method of claim 7, wherein the step of measuring the frequency domain value is applied to multi-tone handshake tones.

10. A digital signal processor for detecting when a tone in a discrete multi-tone communication system is being used as a control signal comprising:

means for computing an average phase shift of the tone; and means for comparing the average phase shift to a predetermined value to determine if a control signal is present.

11. The digital signal processor of claim 10, wherein the means for computing the average phase shift is applied to a single tone of a dual tone signal.

12. The digital signal processor of claim 10, wherein the means for computing the average phase shift is applied to discrete multi-tone tone 68.

13. The digital signal processor of claim 10, wherein the means for computing the average phase shift is applied to discrete multi-tone tone 20.

14. The digital signal processor of claim 10, wherein the means for computing the average phase shift is applied to discrete multi-tone handshake tones.

15. The digital signal processor of claim 10, wherein the means for computing the average phase shift is performed over a predetermined number of samples.

16. A digital signal processor for detecting when a tone in a discrete multi-tone communication system is being used as a control signal comprising:

means for measuring a frequency domain value of tone 68 for each of a predetermined number of sample symbols;

means for calculating a phase of each frequency domain value;

means for calculating a change in phase between successive frequency domain values;

means for calculating an average change in phase over the predetermined number of samples; and means for comparing the average change in phase to a predetermined threshold to determine if a cyclic prefix is present.

17. The digital signal processor of claim 16, wherein the means for measuring the frequency domain value is applied to tone 20.

18. The digital signal processor of claim 16, wherein the means for measuring the frequency domain value is applied to multi-tone handshake tones.

19. A discrete multi-tone communication system configured to detect when a tone is being used as a control signal comprising:

means for computing an average phase shift of the tone; and means for comparing the average phase shift to a predetermined value to determine if a control signal is present.

20. The communication system of claim 19, wherein the means for computing the average phase shift is applied to a single tone of a dual tone signal.

21. The communication system of claim 19, wherein the means for computing the average phase shift is applied to discrete multi-tone tone 68.

22. The communication system of claim 19, wherein the means for computing the average phase shift is applied to discrete multi-tone tone 20.

23. The communication system of claim 19, wherein the means for computing the average phase shift is applied to discrete multi-tone handshake tones.

24. The communication system of claim 19, wherein the means for computing the average phase shift is performed over a predetermined number of samples.

25. The communication system of claim 19, wherein the means for computing the average phase shift is performed with a digital signal processor.

26. The communication system of claim 19, wherein the means for comparing is performed with a digital signal processor.

27. A discrete multi-tone communication system configured to detect when a tone is being used as a control signal comprising:

means for measuring a frequency domain value of tone 68 for each of a predetermined number of sample symbols;

means for calculating a phase of each frequency domain value;

means for calculating a change in phase between successive frequency domain values;

means for calculating an average change in phase over the predetermined number of samples; and means for comparing the average change in phase to a predetermined threshold to determine if a cyclic prefix is present.

28. The communication system of claim 27, wherein the means for measuring the frequency domain value is applied to tone 20.

29. The communication system of claim 27, wherein the means for measuring the frequency domain value is applied to multi-tone handshake tones.

* * * * *